US010618332B2

(12) United States Patent
Nguyen et al.

(10) Patent No.: US 10,618,332 B2
(45) Date of Patent: Apr. 14, 2020

(54) INK MIGRATION BARRIER FOR PRINTABLE STRUCTURES

(71) Applicant: Microsoft Technology Licensing, LLC, Redmond, WA (US)

(72) Inventors: Minh Cao Nguyen, Bothell, WA (US); Anthony James Hewett, Duvall, WA (US); James Alec Ishihara, Bellevue, WA (US); Denise Sara Kleinhans Sadler, Woodinville, WA (US); Steven William Pepin, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/728,356

(22) Filed: Oct. 9, 2017

(65) Prior Publication Data
US 2019/0105932 A1   Apr. 11, 2019

(51) Int. Cl.
*B41M 5/00* (2006.01)
*B32B 27/36* (2006.01)
(Continued)

(52) U.S. Cl.
CPC ............ *B41M 5/0041* (2013.01); *B32B 5/02* (2013.01); *B32B 5/022* (2013.01); *B32B 5/024* (2013.01); *B32B 5/026* (2013.01); *B32B 5/26* (2013.01); *B32B 7/12* (2013.01); *B32B 25/08* (2013.01); *B32B 25/10* (2013.01); *B32B 27/08* (2013.01); *B32B 27/12* (2013.01); *B32B 27/281* (2013.01); *B32B 27/283* (2013.01); *B32B 27/32* (2013.01);
(Continued)

(58) Field of Classification Search
CPC combination set(s) only.
See application file for complete search history.

(56) References Cited

U.S. PATENT DOCUMENTS 4,264,659 A   4/1981   Pattenden
6,331,352 B1  12/2001  Bradley et al.
(Continued)

FOREIGN PATENT DOCUMENTS

WO   2005068206 A1   7/2005
WO   2016200376 A1   12/2016

OTHER PUBLICATIONS

"International Search Report and Written Opinion Issued in PCT Application No. PCT/US18/054050", dated Jan. 17, 2019, 12 Pages.

*Primary Examiner* — Laura C Powers
(74) *Attorney, Agent, or Firm* — Alleman Hall Creasman & Tuttle LLP

(57) ABSTRACT

An example printable structure comprises a first fabric layer that includes a first side that is printable with water-based ink. The first fabric layer is permissive to migration of the water based ink through the first fabric layer. A first adhesive layer is bonded to a second side of the first fabric layer. An ink migration barrier is bonded to the first adhesive layer opposite the first fabric layer, a second adhesive layer is bonded to the ink migration barrier opposite the first adhesive layer, and a second fabric layer is bonded to the second adhesive layer opposite the ink migration barrier. The second fabric layer is permissive to migration of the water-based ink through the second fabric layer. The ink migration barrier is configured to provide resistance to ink bleed from the first fabric layer to the second fabric layer.

9 Claims, 5 Drawing Sheets

(51) Int. Cl.
- *B32B 27/40* (2006.01)
- *B32B 27/08* (2006.01)
- *B32B 5/02* (2006.01)
- *B32B 5/26* (2006.01)
- *B32B 7/12* (2006.01)
- *B32B 25/10* (2006.01)
- *B32B 27/28* (2006.01)
- *B32B 27/12* (2006.01)
- *B32B 27/32* (2006.01)
- *B32B 25/08* (2006.01)
- *B32B 27/34* (2006.01)
- *G06F 1/16* (2006.01)

(52) U.S. Cl.
CPC .............. *B32B 27/34* (2013.01); *B32B 27/36* (2013.01); *B32B 27/40* (2013.01); *B32B 2260/021* (2013.01); *B32B 2260/046* (2013.01); *B32B 2262/0253* (2013.01); *B32B 2262/0261* (2013.01); *B32B 2262/0284* (2013.01); *B32B 2262/0292* (2013.01); *B32B 2262/04* (2013.01); *B32B 2307/4023* (2013.01); *B32B 2307/518* (2013.01); *B32B 2307/7265* (2013.01); *B32B 2307/75* (2013.01); *B32B 2451/00* (2013.01); *B32B 2457/00* (2013.01); *B32B 2571/00* (2013.01); *G06F 1/1669* (2013.01)

(56) References Cited

U.S. PATENT DOCUMENTS

| | | |
|---|---|---|
| 6,472,051 B2 | 10/2002 | Hirabayashi et al. |
| 6,939,583 B2 | 9/2005 | Katsuki et al. |
| 8,915,583 B2 | 12/2014 | Edwards et al. |
| 9,333,791 B2 | 5/2016 | Kaneuchi et al. |
| 2005/0202743 A1 | 9/2005 | Hausmann et al. |
| 2006/0292321 A1 | 12/2006 | Chervin |
| 2011/0041239 A1 | 2/2011 | Altig |
| 2015/0072089 A1 | 3/2015 | Wang et al. |
| 2015/0132508 A1* | 5/2015 | Zhou ................ B05D 7/58 428/32.16 |
| 2015/0181692 A1* | 6/2015 | Jezewski ............ H05K 1/0393 361/679.03 |
| 2016/0235145 A1* | 8/2016 | Weedlun ............ A41D 27/08 |

\* cited by examiner

500

510

ARRANGING THE PRODUCT ON A FIRST ENCASING SUBASSEMBLY, THE FIRST ENCASING SUBASSEMBLY INCLUDING: AN INK MIGRATION BARRIER INCLUDING A POLYURETHANE RESIN-BASED BARRIER LAYER SANDWICHED BETWEEN TWO HOT-MELT ADHESIVE LAYERS; FIRST AND SECOND ADHESIVE LAYERS ARRANGED ON OPPOSING SIDES OF THE INK MIGRATION BARRIER; AND A FIRST FABRIC LAYER BONDED TO THE FIRST ADHESIVE LAYER, THE FIRST FABRIC LAYER INCLUDING AT LEAST POLYURETHANE

520

ARRANGING A SECOND ENCASING SUBASSEMBLY ON THE PRODUCT, OPPOSITE FROM THE FIRST CASING SUBASSEMBLY, THE SECOND ENCASING SUBASSEMBLY INCLUDING AT LEAST A SECOND FABRIC LAYER, THE SECOND FABRIC INCLUDING AT LEAST POLYURETHANE, AND A THIRD ADHESIVE LAYER BONDED TO THE SECOND FABRIC LAYER

530

LAMINATING THE PRODUCT BETWEEN THE FIRST AND SECOND ENCASING SUBASSEMBLIES SO THAT THE SECOND AND THIRD ADHESIVE LAYERS ARE BONDED BOTH TO THE PRODUCT AND TO EACH OTHER

FIG. 5

INK MIGRATION BARRIER FOR PRINTABLE STRUCTURES

BACKGROUND

Dyes and inks may be used to adorn the surfaces of fabrics with designs, patterns, and/or images. Such fabrics may be incorporated into a variety of end products.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In one example, a printable structure comprises a first fabric layer that includes a first side that is printable with water-based ink. The first fabric layer is permissive to migration of the water based ink through the first fabric layer. A first adhesive layer is bonded to a second side of the first fabric layer. An ink migration barrier is bonded to the first adhesive layer opposite the first fabric layer, a second adhesive layer is bonded to the ink migration barrier opposite the first adhesive layer, and a second fabric layer is bonded to the second adhesive layer opposite the ink migration barrier. The second fabric layer is permissive to migration of the water-based ink through the second fabric layer. The ink migration barrier is configured to provide resistance to ink bleed from the first fabric layer to the second fabric layer.

BRIEF DESCRIPTION OF THE DRAWINGS

FIG. 5 shows a flow chart illustrating an example method for encasing a product in a multi-layered printable structure.

DETAILED DESCRIPTION

Numerous consumer and commercial products feature two or more layers of fabric bonded together, often using one or more layers of adhesive there between. Designs, patterns, and/or images may be printed onto one or more sides of the layered fabric structure. However, when two fabric layers are bonded together back-to-back, if artwork is printed on one fabric or both fabrics, the ink printed on the first fabric may migrate over time to the second fabric. This may create an undesirable appearance defect when the ink bleeds onto the cosmetic (e.g., exterior) layer of the second fabric.

This problem may be particularly an issue for water-based inks that are printed onto fabrics containing polyurethane (PU). In such fabrics, the PU material content may increase a rate of ink migration compared to other fabrics, potentially leading to a visible haloing effect. This effect occurs even if the fabric includes fibers that bind more strongly to water-based ink pigments, such as polyester fibers. However, polyurethane may impart numerous other desirable qualities to synthetic fabrics. For example, a polyurethane may impart flexibility, conformability, tensile properties, tear resistance, softness, touchability, and make the fabric easier to process.

Accordingly, examples are disclosed that relate to mitigating dye migration through a layered fabric structure by placing an ink migration barrier in between two fabrics that are bonded back-to-back. Such an ink migration barrier may be constructed to allow for the layered fabric structure to retain flexibility without concerns for dye migration, regardless of what portions of the fabric are printed. Layered fabric structures including an ink migration barrier may be applied to single-sided printed fabrics, and may further be applied to product covers where one or both sides of the product are adorned with a printed design.

Figure 1:
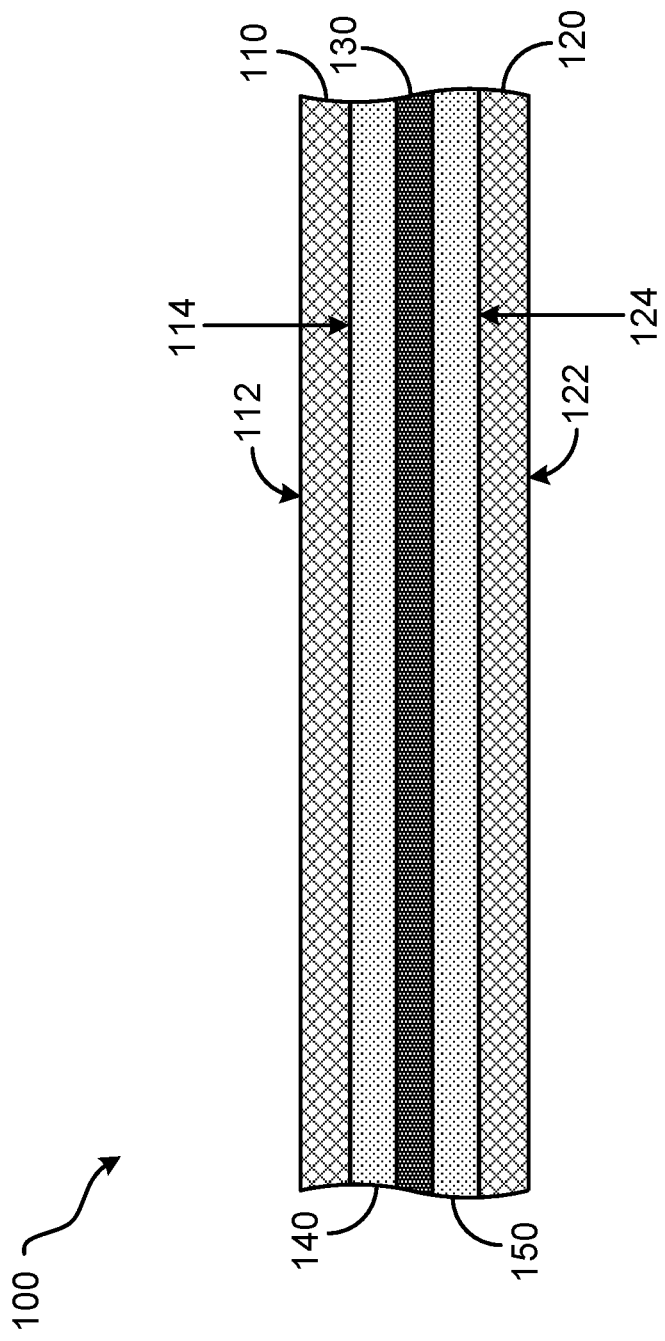
FIG. 1 schematically shows a multi-layered printable structure.

FIG. 1 shows an example multi-layered printable structure 100. Multi-layered printable structure 100 includes a first fabric layer 110 having a first side 112 and a second side 114. First side 112 may be an external side, and may be a printable side of first fabric layer 110. Multi-layered printable structure 100 further includes a second fabric layer 120 also including a first side 122 and a second side 124. First side 122 may be an external side, and may be a printable side of first fabric layer 120.

First fabric layer 110 and second fabric layer 120 may be any suitable fabrics that are printable with water-based inks. As mentioned above, first fabric layer 110 and second fabric layer 120 may be permissive to migration of the water-based ink. For example, water-based ink printed on first side 112 of first fabric layer 110 may migrate through first fabric layer 120 to second side 114. Similarly, water-based ink printed on first side 122 of second fabric layer 110 may migrate through second fabric layer 120 to second side 124.

In some examples, first fabric layer 110 and second fabric layer 120 may include at least polyurethane. As a more specific example, polyurethane fibers may be included in a synthetic fabric that further includes other fibrous material such as polyester fibers. As an example, the fabric layers may be generated from fibers that include a blend of at least polyester and polyurethane. In some examples, the fibrous polyester material may be bound, for example, using polyurethane. Other materials may additionally or alternatively be used as a binder for microfiber fabrics, such as polyamide and/or other suitable materials.

Additionally or alternatively, one or more of first fabric layer 110 and second fabric layer 120 may be other dye-migratory microfiber-based fabrics, woven fabrics, etc. For example, first fabric layer 110 and second fabric layer 120 may include woven polyester fabric, knit polyester fabric, and/or other woven or knit fabrics that may or may not include polyurethane. First fabric layer 110 and second fabric layer 120 may be different fabrics and/or fabrics that include the same sub-components in different ratios or configurations. As examples, first fabric layer 110 and/or second fabric layer 120 may comprise one or more of PE fibers, polyamide fibers (e.g., nylon), cellulosic fibers, polypropylene fibers, polystyrene fibers, acrylonitrile butadiene styrene fibers, poly (vinyl butyral) fibers, and/or other fiber and microfiber types.

While described in the context of water-based inks and fabric layer materials which permit migration of water-based inks, it should be understood that other combinations of inks and fabrics may be used within multi-layered printable structure 100 and other printable structures described herein, provided the fabric(s) are conducive to migration of the selected inks and/or dyes. For example, polyester-based fabrics, among other fabric types, may be conducive to the migration of oil-based inks, such as plastisol inks, organic solvent-based inks, latex inks, UV-curable inks, etc.

One or both of first fabric layer 110 and second fabric layer 120 may be printable with water-based ink. In particular, first side 112 of first fabric layer 110 and/or first side 122 of second fabric layer 120 may receive printed dyes and/or inks. Water-based ink may be directly printed onto first and/or second fabric layers 110 and 120, and/or may first be printed onto a carrier medium and then transferred onto a fabric layer.

As an example, dye sublimation ink pigments may be applied to first side 112 of first fabric layer 110 and/or first side 122 of second fabric layer 120 through a sublimation process. Dye sublimation inks are typically water-soluble, allowing the inks to penetrate fibers in the fabric layer without modifying the characteristics of the fibers themselves. Dye sublimation inks may be ink-jet printed onto a carrier paper. The carrier paper may then be dried and put in to close contact with the selected fabric layer. Heat and pressure may then be applied over time, for example, using a heat press machine. The dye sublimation inks may then sublimate from the carrier paper to the fabric layer, where the ink may bind to the polyester fiber components of the fabric layer. However, porous fabric layers such as knit or woven polyester fibers may permit dye migration through the fabric layer. Further, the dyes may not bind well to polyurethane components of the fabric layer, allowing excess ink to migrate through the fabric layer.

To prevent migration of inks between first fabric layer 110 and second fabric layer 120, an ink migration barrier 130 may be deposed between the two fabric layers. In this example, printable structure 100 further comprises a first adhesive layer 140 bonded to second side 114 of first fabric layer 110 and ink migration barrier 130 is bonded to first adhesive layer 140 opposite from first fabric layer 110. A second adhesive layer 150 is bonded to ink migration barrier 130 opposite from first adhesive layer 140. Second adhesive layer 150 is bonded to second side 124 of second fabric layer 120 opposite from ink migration barrier 130.

First and second adhesive layers 140 and 150 may comprise any suitable adhesives that may bind to both fabric layers 110 and 120 as well as to ink migration barrier 130. For example, first and second adhesive layers 140 and 150 may be adhesive films that are activated by heat and/or pressure. Heat activated bonding between an adhesive layer, a fabric layer, and an ink migration barrier may be carried out under conditions specific to the materials and equipment (e.g., heat press, heated roll, heated belt laminator). In some examples, first and second adhesive layers 140 and 150 may be activated using high frequency and/or ultrasonic energy.

The thickness of first and second adhesive layers 140 and 150 may vary based on application, for example between 1 and 10 mm, although thicker or thinner layers may also be used. In some examples, one or more of first and second adhesive layers 140 and 150 may comprise ester-based polyurethane films, nylon-based polyamide films, rubber, acrylic, silicone-based pressure sensitive adhesives, ethylene vinyl acetate, one or more UV curable adhesives (e.g., UV curable PET film, acrylated compound film), and/or other suitable adhesive materials. In some examples, first and second adhesive layers 140 and 150 may be formed from a same material. In some examples, first and second adhesive layers 140 and 150 may not be identical layers. For example, first and second adhesive layers 140 and 150 may differ in thickness, composition, shape, etc. Where first and second fabric layers 110 and 120 differ in composition, first and second adhesive layers 140 and 150 may be selected independently based on desired bonding characteristics.

Ink migration barrier 130 may comprise any suitable material that prevents and/or significantly reduces the migration of ink between first and second fabric layers 110 and 120. Ink migration barrier 130 may be a non-porous film that either binds or repels water-based ink or otherwise inhibits water-based ink from traversing the film. Ink migration barrier 130 may be bondable to other films and/or fabrics. For example, ink migration barrier 130 may include a heat-sensitive thin film.

Figure 2:
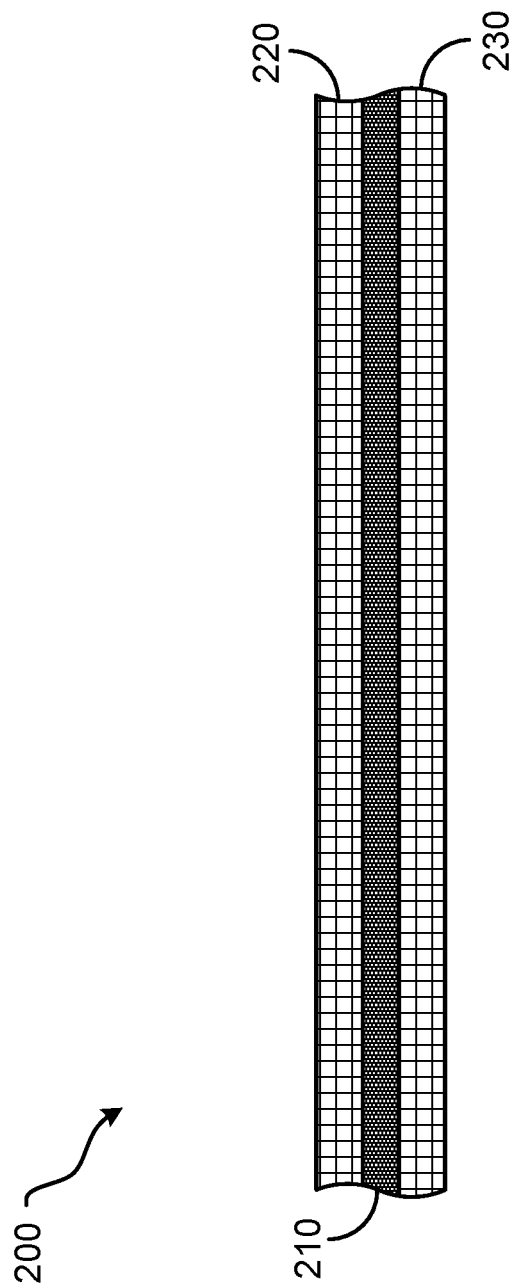
FIG. 2 schematically shows an ink migration barrier.

In some examples, ink migration barrier 130 may comprise a multi-layered film. For example, FIG. 2 schematically shows a multi-layered ink migration barrier 200 as an example of ink migration barrier 130. Ink migration barrier 200 includes a first barrier layer 210. First barrier layer 210 may include a polyurethane resin-based film, which may include one or more additional materials (e.g., PET as a dopant). In some examples, first barrier layer 210 may alternatively or additionally include biaxially-oriented polyethylene terephthalate (BoPET), woven and/or non-woven polyester fabrics, polypropylene, PET, silicone membranes, polyimide films, etc.

A first barrier layer 210 that is comprised of a polyurethane resin-based film may be advantageous in that, not only does the barrier block ink bleeding between two fabric layers that are bonded back-to-back, but the first barrier layer may be sufficiently thin to allow for minimal impact on the overall thickness of the printable structure. For example, first barrier layer 210 may have a thickness of less than 0.1 mm (e.g., 0.04 mm).

However, when applied directly to an adhesive layer, thin polyurethane resin-based films may soften before coating. As such, it may be advantageous to laminate other films to first barrier layer 210 prior to bonding ink migration barrier 200 to adhesive layers. As an example, ink migration barrier 200 may include one or more hot-melt film adhesive layers bonded to first barrier layer 210. As shown in FIG. 2, ink migration barrier 200 includes a first hot-melt film adhesive layer 220 and a second hot-melt film adhesive layer 230 applied to each side of first barrier layer 210.

As an example, hot-melt film adhesive layers 220 and 230 may comprise a modified polyurethane resin, among other materials (e.g., 90% polyurethane resin). Hot-melt film adhesive layers 220 and 230 may be thin films (e.g., 0.02 mm), so as to reduce the overall impact on the thickness of the ink migration barrier. As per adhesive layers 140 and 150, hot-melt film adhesive layers 220 and 230 may be made from a same material, or may have differing compositions, thicknesses, shapes, etc., depending on the composition of the neighboring layers within the printable structure, and the overall application. As examples, hot-melt film adhesive layers may comprise non-shrinking thermoplastic films, such as polyethylene films, polyamide films, olefin films, etc.

Multi-layered printable structure 100 may be used for any suitable application in which two-sided fabric that is asymmetrically printed (e.g., printing on one side, different printing on opposing sides) is desired. As non-limiting examples, multi-layered printable structure 100 may be used in clothing garments, handbags, outdoor furniture, athletic equipment, window curtains and drapes, towels, table linens, umbrellas, wind/sun shields, bedding linens and textiles, etc.

Figure 3:
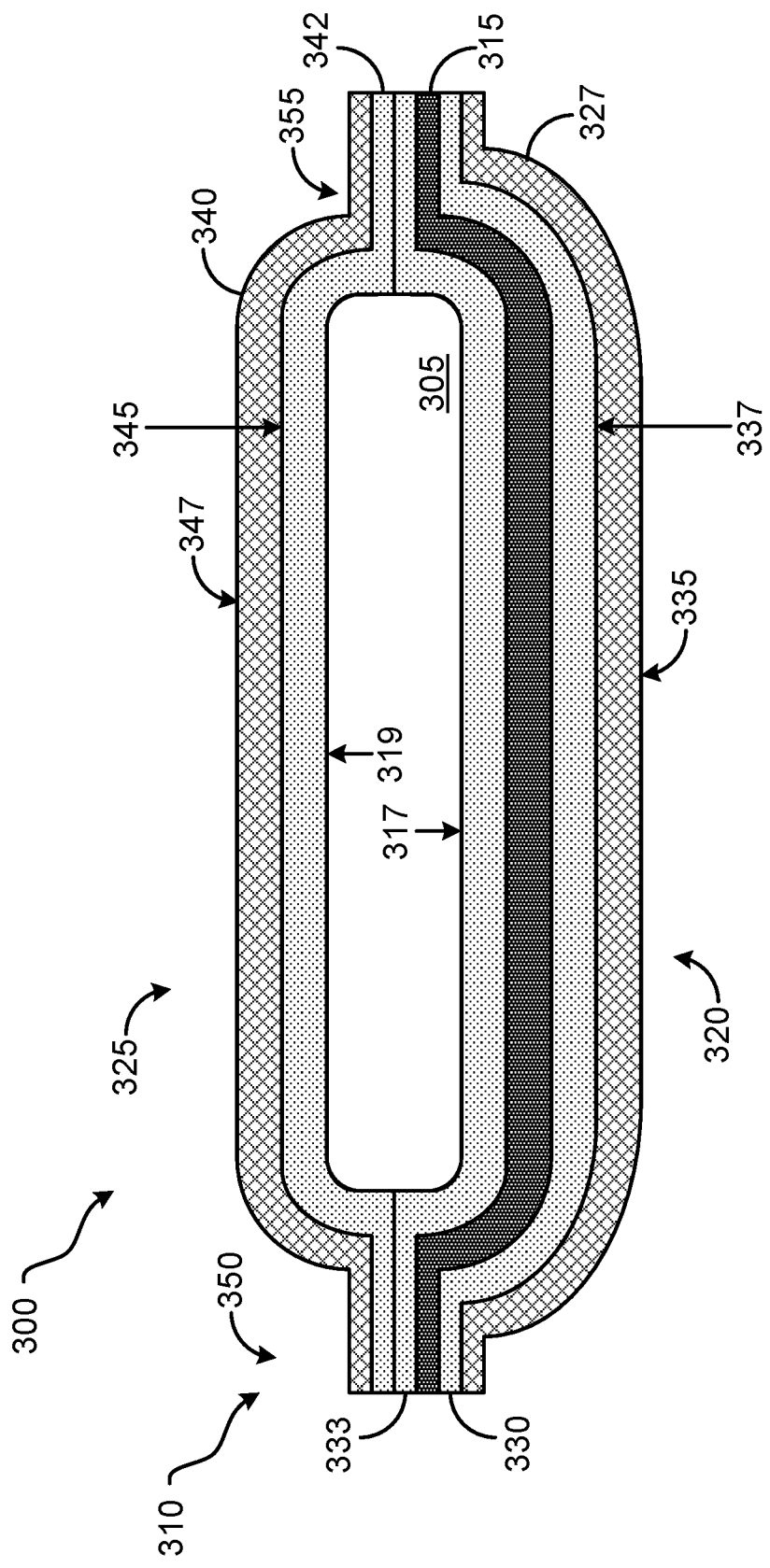
FIG. 3 schematically shows a product assembly encased in a multi-layered printable structure including an ink migration barrier.

In addition to two-sided fabric applications, multi-layered printable structures may also be used to decorate the exterior of a product. For example, FIG. 3 schematically shows an example product assembly 300. Product assembly 300 includes a device 305 encased in a multi-layered printable structure 310 including an ink migration barrier 315. Ink migration barrier 315 may be an example of ink migration barrier 200, and may thus include a polyurethane resin-based ink-migration barrier sandwiched between two hot-melt film adhesives.

As shown in FIG. 3, device 305 is a relatively flat device including a first side 317 and a second side 319 that is relatively parallel to first side 317 (e.g., within 5 degrees of parallel). For example, device 305 may be a keyboard for a tablet computer, a tablet computer, a laptop computer, a smart phone, a wearable electronic device (e.g. wrist-worn device, head-mounted device), or other portable device. In other examples, device 305 may be an automotive sun visor, a stand and/or case for a secondary device, or other non-electronic device or soft-good. Other examples and configurations also are possible. Device 305 may be a relatively inflexible device, as compared to multi-layered printable structure 310. In other examples, device 305 may be a relatively flexible device that adjusts conformation in concert with multi-layered printable structure 310 when pressure is applied to product assembly 300. Device 305 may be composed of materials that are impermissive to the migration of ink or dye.

Multi-layered printable structure 310 may be used to encase device 305, and thus provide a covering that is decorative and/or functional (e.g., comfortable, soft to the touch, tactile, protective). Multi-layered printable structure 310 includes a first encasing subassembly 320 and a second encasing subassembly 325. First encasing subassembly 320 includes first fabric layer 327, first adhesive layer 330, ink migration barrier 315, and second adhesive layer 333. However, in some examples, ink migration barrier 315 and/or second adhesive layer 333 may be included in second encasing subassembly 325.

First fabric layer 327 may include a first, printable side 335, and a second side 337, opposite first side 335. As described with regard to FIG. 1, first fabric layer 327 may be a composite fabric structure that is permissive to migration of water-based ink, such as a structure that includes fibers containing a blend of polyester and polyurethane. First side 335 may be printed with water-based ink, such as dye-sublimation ink. Either prior to, or following printing and drying, first fabric layer 327 may be die-cut to a geometry that is close to a desired final geometry for encasing device 305. The die-cut fabric may include features (e.g., holes) that enable loading of the fabric onto a device for laminating and/or bonding first fabric layer 327 to other components of first encasing subassembly 320 and/or second encasing subassembly 325.

Ink migration barrier 315 may be assembled by heating and pre-tacking hot-melt film adhesive layers to both sides of a polyurethane resin-based barrier layer in a roll form, for example. The assembled ink migration barrier roll may then be die-cut to a geometry similar to that of first fabric layer 327. Both ink migration barrier 315 and first fabric layer 327 may then be placed in fixture to be pre-tacked together.

First adhesive layer 330 and second adhesive layer 333 may include heat-activated adhesive films, such as ester-based polyurethane films, nylon-based polyamide films, etc., though pressure-sensitive adhesive films and UV curable adhesive films may also be used. First adhesive layer 330 and second adhesive layer 333 may be applied to opposite sides of assembled ink migration barrier 315, for example, by thermal bonding. As an example, the adhesive layers may be applied to ink migration barrier 315 in roll form, staged and settled, then die-cut to a near-final geometry. In some examples, one or both adhesive layers may be die-cut prior to being applied to ink migration barrier 315.

Second encasing subassembly 325 includes second fabric layer 340 and third adhesive layer 342. Second fabric layer 340 includes a first side 345, and a second, printable side 347, opposite first side 345. As described with regard to FIG. 1, second fabric layer 340 may be a composite fabric structure that is permissive to migration of water-based ink, such as a structure that includes fibers containing a blend of polyester and polyurethane. As per first and second adhesive layers 330 and 333, third adhesive layer 342 may include one or more heat-activated adhesive films, pressure-sensitive adhesive films, and/or UV curable adhesive films. Second side 347 of second fabric layer 340 may be printed and dried, and third adhesive layer 342 may be applied to first side 345 of second fabric layer 340, for example, by thermal bonding. Second encasing subassembly 325 may then be die cut for assembly around device 305. However, in some examples, one or both of second fabric layer 340 and third adhesive layer 342 may be die-cut prior to being bonded together.

First encasing subassembly 320 and second encasing subassembly 325 may be placed on opposing sides of device 305. In this configuration, first side 317 of device 305 is in contact with second adhesive layer 333, on the opposite side of second adhesive layer 333 from ink migration barrier 315. Second side 319 of device 305 is in contact with third adhesive layer 342, on the opposite side of second adhesive layer 342 from first side 345 of second fabric layer 340.

When encasing subassemblies 320 and 325 have been placed in position around device 305, the subassemblies may undergo a product lamination process (e.g., heat lamination), whereby first encasing subassembly 320 is bonded to device 305 and second encasing subassembly 325 via second adhesive layer 333, and second encasing subassembly 325 is bonded to device 305 and first encasing subassembly 320 via third adhesive layer 342. This generates product assembly 300, wherein device 305 now has a decorative and/or functional covering.

The final lamination process generates fabric-on-fabric regions 350 and 355. In these regions, first fabric layer 327 and second fabric layer 340 are coupled together without device 305 in between. At the edges of product assembly 300, fabric-on-fabric regions 350 and 355 may be trimmed for cosmetic or functional purposes. However, the presence of ink migration barrier 315 within the fabric-on-fabric regions limits the bleed-through of ink from one fabric layer to the other.

Figure 4A:
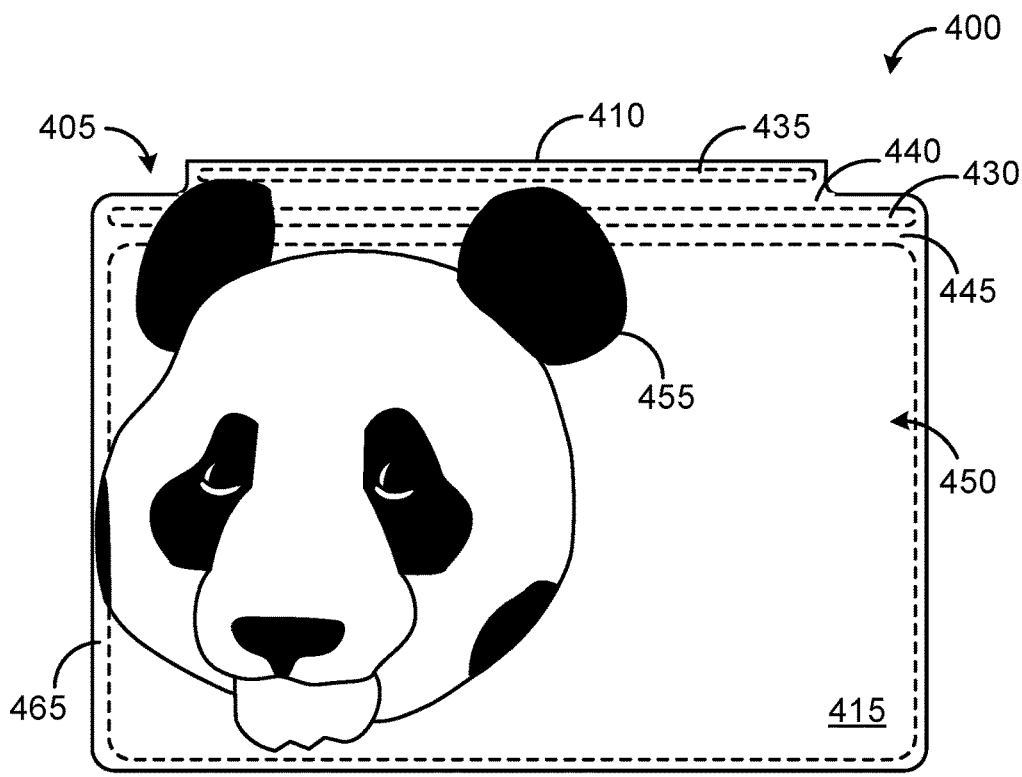
FIG. 4A shows a first side of an example electronic device encased in a multi-layered printable structure including an ink migration barrier.
Figure 4B:
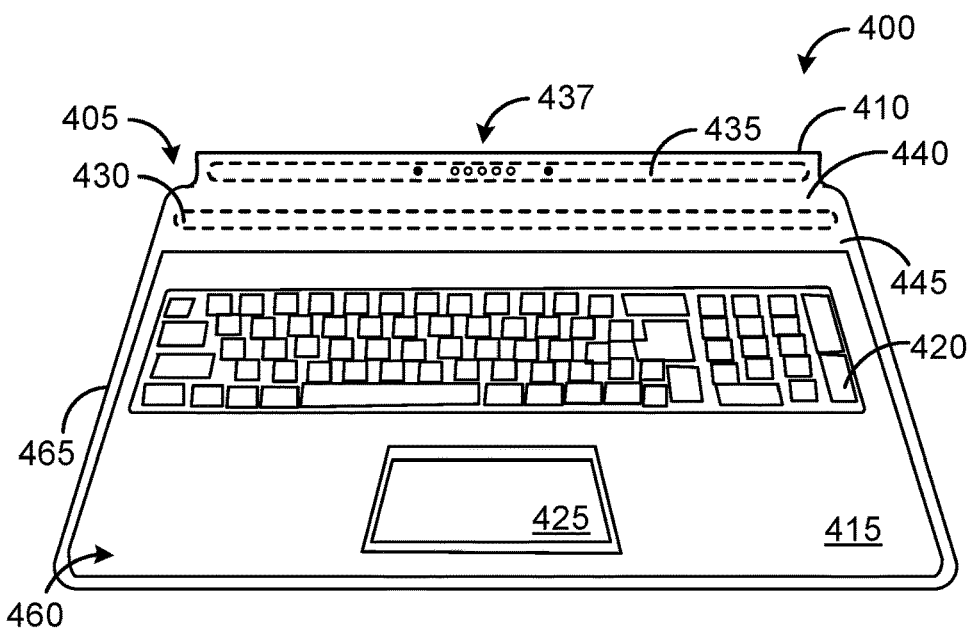
FIG. 4B shows a second side of an example electronic device encased in a multi-layered printable structure including an ink migration barrier.

As an example, a product assembly as described with regard to FIG. 3 may be an electronic device. FIGS. 4A and 4B depict a product assembly 400 including a detachable keyboard 405 that may be encased in a printed cover 410. Product assembly 400 may be an example of product assembly 300, and detachable keyboard 405 may be an example of device 305. Printed cover 410 may be an example of multi-layer printable structure 310, including two printable fabric layers, two adhesive layers, and an ink migration barrier.

Detachable keyboard 405 may include a user input region 415, including a keyboard 420 and a touch pad 425. As shown, detachable keyboard 405 further includes a mid-spine region 430 and a spine region 435. Spine region 435 includes a plurality of connectors 437, which may be used to physically and communicatively couple detachable keyboard 405 to an external electronic device, such as a display screen, tablet computer, etc.

Mid-spine region 430 may include an inflexible or less flexible segment that spans the width of detachable keyboard 405. Mid-spine region may be used to house components and circuitry of detachable keyboard 405, and may further provide a magnetic and/or physical anchoring point for allowing detachable keyboard 405 and an attached display device to be used akin to a laptop form function.

A first flexible region 440 may be located between spine region 435 and mid-spine region 430. A second flexible region 445 may be located between mid-spine region 430 and user input region 415. First and second flexible regions may house componentry, such as flex circuitry and cables, connecting user input region 415, mid-spine region 430, and spine region 435. First flexible region 440 and second flexible region 445 may allow for detachable keyboard 405 to adopt numerous configurations for operation and storage, either alone or when connected to an external device via connectors 437.

FIG. 4A shows a first side 450 of cover 410. First side 450 includes a first fabric layer featuring printed artwork 455. FIG. 4B shows a second side 460 of cover 410. Second side 460 includes a second fabric layer which may be die-cut so that cover 410 is not bonded to keyboard 420, touch pad 425, or connectors 437. The lamination process may generate a border 465, wherein the two fabric layers are bonded together (via adhesive layers and an ink migration barrier) without a portion of detachable keyboard 405 there between.

As such, border 465, first flexible region 440, and second flexible region 445 may include regions of fabric-on-fabric bonding. As shown in FIG. 4A, printed artwork 455 places ink within each of these regions. Without an ink migration barrier present in cover 410, ink may thus migrate from first side 450 to second side 460, generating discoloration and visible artifacts within six months or sooner after product assembly. In some examples, an ink migration barrier, such as BoPET strips, may be laminated exclusively onto the regions with fabric-on-fabric bonding, but this configuration may only serve to slow dye migration and may not stop dye bleed-through altogether. By including an ink migration barrier, such as a polyurethane-based film, dye migration may be prevented over the lifetime of the product, thus allowing artwork to be printed anywhere on first side 450 without risking dye migration to second side 460. Further, by using a thin, flexible ink migration barrier, the flexibility of flexible regions 440 and 445 may be maintained. Additionally, border 465 may maintain a pliability, rather than taking on a rigidity that may be less pleasant for a user to touch.

FIG. 5 shows a flow-chart for an example method 500 for encasing a product with a multi-layered printable structure. In some examples, various steps of method 500 may be performed at distinct locations and/or in separate, temporally different processes.

At 510, method 500 includes arranging the product on a first encasing subassembly, the first encasing subassembly including: an ink migration barrier including a polyurethane resin-based barrier layer sandwiched between two hot-melt adhesive layers; first and second adhesive layers arranged on opposing sides of the ink migration barrier; and a first fabric layer bonded to the first adhesive layer, the first fabric layer including at least polyurethane. The first fabric layer may be permissive to migration of water-based ink through the first fabric layer. For example, the first fabric layer may include fibers that include a blend of at least polyester and polyurethane. As described with regard to FIG. 3, assembling an ink migration barrier may include heating and pre-tacking hot-melt film adhesive layers to both sides of a polyurethane resin-based barrier layer in a roll form, and may further include die-cutting the assembled ink migration barrier roll to a desired geometry. The first and second adhesive layers may be heat-activated adhesive films, such as ester-based polyurethane films. As such, the first and second adhesive layers may be applied to opposite sides of the assembled ink migration barrier by thermal bonding, such as thermal lamination. The adhesive layers may be die-cut to a desired geometry following, or prior to being applied to the assembled ink migration barrier. The first fabric layer may be printed with a water-based ink, dried, and die-cut to a desired geometry. The printed first fabric layer may then be adhered to the first adhesive layer opposite the ink migration layer via thermal bonding.

At 520, method 500 includes arranging a second encasing subassembly on the product, opposite from the first casing subassembly, the second encasing subassembly including at least a second fabric layer including at least polyurethane, and a third adhesive layer bonded to the second fabric layer. The second fabric layer may be permissive to migration of water-based ink through the second fabric layer. For example, the second fabric layer may include fibers that include a blend of at least polyester and polyurethane.

At 530, method 500 includes laminating the product between the first and second encasing subassemblies so that the second and third adhesive layers are bonded both to the product and to each other.

In another example, a printable structure comprises: a first fabric layer including a first side that is printable with water-based ink, the first fabric layer permissive to migration of the water-based ink through the first fabric layer; a first adhesive layer bonded to a second side of the first fabric layer; an ink migration barrier bonded to the first adhesive layer opposite the first fabric layer; a second adhesive layer bonded to the ink migration barrier opposite the first adhesive layer; and a second fabric layer bonded to the second adhesive layer opposite the ink migration barrier, the second fabric layer permissive to migration of the water-based ink through the second fabric layer. In such an example, or any other example, the first fabric layer may additionally or alternatively include polyester fibers. In any of the preceding examples, or any other example, the first fabric layer may additionally or alternatively include polyurethane. In any of the preceding examples, or any other example, the second fabric layer may additionally or alternatively include a first side printable with the water-based ink. In any of the preceding examples, or any other example, the first and second adhesive layers may additionally or alternatively include heat activated adhesive films. In any of the preceding examples, or any other example, the first and second adhesive layers may additionally or alternatively include ester-based polyurethane films. In any of the preceding examples, or any other example, the ink migration barrier may additionally or alternatively include a first barrier layer including polyurethane resin doped with polyethylene terephthalate. In any of the preceding examples, or any other example, the ink migration resistant barrier may additionally or alternatively include one or more hot-melt film adhesive layers bonded to the first barrier layer. In any of the preceding examples, or any other example, the ink migration resistant barrier may additionally or alternatively include hot-melt film adhesive layers bonded to each side of the first barrier layer.

In another example, a product assembly comprises: a device having a first side and a second side, opposite the first side; a multi-layered printable structure configured to encase the device, the multi-layered printable structure including a first encasing subassembly positioned on the first side of the device and a second encasing subassembly positioned on the second side of the device, the first encasing subassembly including: a first fabric layer including at least polyurethane, the first fabric layer including a first side that is printable with water-based ink; a first adhesive layer bonded to a second side of the first fabric layer; an ink migration barrier bonded to the first adhesive layer opposite the first fabric layer; a second adhesive layer bonded to the ink migration barrier opposite the first adhesive layer; and wherein the second encasing subassembly includes: a second fabric layer including at least polyurethane; and a third adhesive layer bonded to a first side of the second fabric layer; and wherein the first and second encasing subassemblies are bonded around the device, so that the first side of the device is bonded to the second adhesive layer, and so that the second side of the device is bonded to the third adhesive layer. In this example, or any other example, the first and second encasing subassemblies may additionally or alternatively be bonded together such that one or more fabric-on-fabric regions are generated wherein the device is not situated between the first fabric layer from the second fabric layer. In any of the preceding examples, or any other example, the first fabric layer may additionally or alternatively include polyester fibers. In any of the preceding examples, or any other example, the second fabric layer may additionally or alternatively include a second side printable with a water-based ink, opposite the first side. In any of the preceding examples, or any other example, the first, second, and third adhesive layers may additionally or alternatively include heat activated adhesive films. In any of the preceding examples, or any other example, the first, second, and third adhesive layers may additionally or alternatively include ester-based polyurethane films. In any of the preceding examples, or any other example, the ink migration barrier may additionally or alternatively include a first barrier layer including polyurethane resin doped with polyethylene terephthalate. In any of the preceding examples, or any other example, the ink migration resistant barrier may additionally or alternatively include hot-melt film adhesive layers bonded to each side of the first barrier layer. In any of the preceding examples, or any other example, the device may additionally or alternatively be a detachable keyboard assembly.

In yet another example, a method for encasing a product with a multi-layered printable structure, comprises: arranging the product on a first encasing subassembly, the first encasing subassembly including: an ink migration barrier including a polyurethane resin-based barrier layer sandwiched between two hot-melt adhesive layers; first and second adhesive layers arranged on opposing sides of the ink migration barrier; and a first fabric layer bonded to the first adhesive layer, the first fabric layer including at least polyurethane; arranging a second encasing subassembly on the product, opposite from the first casing subassembly, the second encasing subassembly including at least a second fabric layer including at least polyurethane, and a third adhesive layer bonded to a first side of the second fabric layer; and laminating the product between the first and second encasing subassemblies so that the second and third adhesive layers are bonded both to the product and to each other. In such an example, or any other example, the first fabric layer may additionally or alternatively include polyester fibers.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A product assembly, comprising:
a device having a first side and a second side opposite the first side;
a multi-layered printable structure configured to encase the device, the multi-layered printable structure including a first encasing subassembly positioned on the first side of the device and a second encasing subassembly positioned on the second side of the device, wherein the first encasing subassembly includes:
a first fabric layer including at least polyurethane, the first fabric layer including a first side that is printable with water-based ink,
a first adhesive layer bonded to a second side of the first fabric layer,
an ink migration barrier bonded to the first adhesive layer opposite the first fabric layer, and
a second adhesive layer bonded to the ink migration barrier opposite the first adhesive layer;
wherein the second encasing subassembly includes:
a second fabric layer including at least polyurethane, and
a third adhesive layer bonded to a first side of the second fabric layer; and wherein
the first and second encasing subassemblies are bonded around the device, so that the first side of the device is bonded to the second adhesive layer, the second side of the device is bonded to the third adhesive layer, and the ink migration barrier is positioned between the first fabric layer and the second fabric layer at least in a region in which the first and second encasing subassemblies are coupled together without the device therebetween.

2. The product assembly of claim 1, wherein the ink migration barrier comprises a thickness$\leq 0.1$ millimeters.

3. The product assembly of claim 1, wherein the first fabric layer further includes polyester fibers.

4. The product assembly of claim 1, wherein the second fabric layer includes a second side printable with a water-based ink, opposite the first side.

5. The product assembly of claim 1, wherein the first, second, and third adhesive layers include heat activated adhesive films.

6. The product assembly of claim 5, wherein the first, second, and third adhesive layers include ester-based polyurethane films.

7. The product assembly of claim 1, wherein the ink migration barrier includes a first barrier layer including polyurethane resin doped with polyethylene terephthalate.

8. The product assembly of claim 7, wherein the ink migration barrier includes hot-melt film adhesive layers bonded to each side of the first barrier layer.

9. The product assembly of claim 1, wherein the device is a detachable keyboard assembly.

* * * * *